United States Patent
Mascolo et al.

(10) Patent No.: US 7,561,795 B2
(45) Date of Patent: Jul. 14, 2009

(54) DYNAMIC INTERLAYER PROTECTION IN OPTICAL TELECOMMUNICATION NETWORKS

(75) Inventors: Vittorio Mascolo, Lodivecchio (IT); Virgilio Miriello, Vimercate (IT)

(73) Assignee: ALCATEL, Paris (FR)

( * ) Notice: Subject to any disclaimer, the term of this patent is extended or adjusted under 35 U.S.C. 154(b) by 437 days.

(21) Appl. No.: 10/963,713

(22) Filed: Oct. 14, 2004

(65) Prior Publication Data

US 2005/0123294 A1    Jun. 9, 2005

(30) Foreign Application Priority Data

Dec. 5, 2003    (EP) ................. 03293052

(51) Int. Cl.
*H04B 10/08* (2006.01)
(52) U.S. Cl. .............. 398/19; 398/1; 398/2; 398/3; 398/4; 398/5; 398/9; 398/17; 398/20; 398/25; 398/27; 370/216; 370/217; 370/221; 370/225
(58) Field of Classification Search ............ 398/1–7, 398/17–20, 27, 9, 25; 370/216–258; 709/236
See application file for complete search history.

(56) References Cited

U.S. PATENT DOCUMENTS

| | | | | |
|---|---|---|---|---|
| 6,147,968 | A * | 11/2000 | De Moer et al. | 370/225 |
| 6,512,611 | B1 * | 1/2003 | Phelps et al. | 398/4 |
| 6,614,754 | B1 * | 9/2003 | Usuba et al. | 370/222 |
| 6,928,248 | B2 * | 8/2005 | Achour et al. | 398/115 |
| 6,934,248 | B1 * | 8/2005 | DeBoer et al. | 370/217 |
| 7,042,835 | B1 * | 5/2006 | de Boer et al. | 370/222 |
| 7,072,361 | B1 * | 7/2006 | Player | 370/470 |
| 7,174,096 | B2 * | 2/2007 | Berthold et al. | 398/5 |
| 2003/0120799 | A1 * | 6/2003 | Lahav et al. | 709/236 |
| 2004/0109408 | A1 * | 6/2004 | Mesh et al. | 370/222 |

(Continued)

FOREIGN PATENT DOCUMENTS

EP    0 926 852 A2    6/1999

(Continued)

OTHER PUBLICATIONS

Zhao et al: "Integrated Multilayer Survivability Strategy with Inter-Layer Signaling", Proceedings of ICCT2003, Apr. 9-11, 2003, Beijing, China, pp. 612-616.*

(Continued)

*Primary Examiner*—Ken N Vanderpuye
*Assistant Examiner*—Li Liu
(74) *Attorney, Agent, or Firm*—Sughrue Mion, PLLC

(57) ABSTRACT

The present invention relates to a method for protecting an optical telecommunication network against possible failures and signal degrades, the network comprising at least two nodes; working resources and protecting resources connecting the nodes; a first protection mechanism operating at a first protection layer; and a second protection mechanism operating at a second protection layer, characterized by a) the step, carried out by a node detecting a failure that could be managed by said first mechanism, of sending downstream an in-band Forward Protection Indication signalling in order to instruct the second protection mechanism not to operate, or b) the step, carried out by a node detecting a Bit Error Rate between a certain range, of sending downstream an in-band Link Degradation Indication signalling in order to instruct the second protection mechanism to operate.

22 Claims, 3 Drawing Sheets

U.S. PATENT DOCUMENTS

2005/0041601 A1* 2/2005 Kam et al. .................. 370/258

FOREIGN PATENT DOCUMENTS

EP  1 271 822 A2  1/2003

OTHER PUBLICATIONS

Gerstel et al: "Optical Layer Survivability—An Implementation Perspective", IEEE Journal on Selected Areas in Communications, vol. 18, No. 10, Oct. 2000, pp. 1885-1899.*

Sadler: "Increasing IP Network Survivability: An Introduction to Protection Mechanism", NANOG, Oct. 22, 2000, pp. 1-35.*

Wu et al: "Recovery from control plane failures in GMPLS-controlled optical networks", Int. J. Commun. Syst., 2002; vol. 15, pp. 573-592.*

ITU-T G.709/Y.1331 (Mar. 2003) Series G: Transmission Systems and Media, Digital Systems and Networks Digital terminal equipments—General; Series Y: Global Information Infrastructure and Internet Protocol Aspects Internet Protocol Aspects—Transport "Interfaces for the optical transport network (OTN)" pp. 1-65.

ITU-T G/872 (Nov. 2001) Series G: Transmission Systems and Media, Digital Systems and Networks—Digital Networks—Optical transport networks "Architecture of optical transport networks", pp. 1-61.

* cited by examiner

DYNAMIC INTERLAYER PROTECTION IN OPTICAL TELECOMMUNICATION NETWORKS

This application is based on, and claims the benefit of, European Patent Application No. 03293052.1 filed on Dec. 5, 2003 which is incorporated by reference herein.

BACKGROUND OF THE INVENTION

1. Field of the Invention

The present invention relates to the field of Optical Transport Networks and in particular a method for interlayer protecting such networks. The present invention also relates to a node and a network implementing such a method.

2. Description of the Prior Art

ITU-T G.872 Recommendation (version 11/2001, which is incorporated herewith as a reference) defines the architecture of OTN (Optical Transport Network) also termed OTH (Optical Transport Hierarchy). The two terms are considered as equivalent for the purposes of the present invention. The OTN is made of three main layers: OTS (Optical Transmission Section), OMS (Optical Multiplex Section) and OCH (Optical Channel). Furthermore, ITU-T G.709 Recommendation (03/2003, which is also incorporated herewith as a reference) defines the OCH layer structure and the frame format of the optical channel at the ONNI (Optical Network Node Interface).

In this scenario, the present invention, focuses on the OTU/ODU layer. ITU-T G.709 foresees some information to manage these layers. For each layer, the transported information is made of payload and Over-Heads. Particularly the OCH layer, made of two main units (ODU and OTU), transports payload and associated Overhead information. The purpose of the OCH is to carry information to manage and to monitor the end-to-end connection through the network.

The Applicant has identified two pending technical problems. The first consists in allowing interlayer protocol communication between two different protection segments (i.e. OTU trail and ODU-SNC or OTU trail and ODU-Trail) or between two different levels of switches within the same protection layer and driven by the same protection mechanism: i.e. ODU-SPRing span switch and ODU-SPRing ring switch. The second consists in providing the ability to forward an OTU-Trail degradation indication (signal degrade condition) to the remote ODU-Trail termination function in charge to activate the switching action either in the ODU-Trail or in the ODU-SNC protection configurations.

A problem similar to the above first one has been identified in synchronous transport networks, typically SDH or SONET networks. For instance, a SDH network could be protected at a Server layer and at a Client layer. At a Client layer, a path is protected by providing an alternative route for connecting two end nodes. At a Server layer, each single section could be protected by a MS-Protections mechanism. If a fiber cut or a carrier failure occurres in a span, both the two mechanisms start to operate. No coordination action is performed between the protection mechanisms at Client and Server layers. Generally, the section protection mechanism (at Server layer) is the one starting its operation first. In the SDH technology, the above problem has been solved by the so-called Hold Off Time, briefly, HOT. According to it, a timer is set at a certain time frame (for instance at 100 millisec); upon an end node has received a signal fail (or degrade) indication, the timer is started; if the protection mechanism at Server layer succedes in solving the fail problem before the expiring of the timer time frame, no client layer mechanism is activated; in the negative, the client layer protection mechanism is activated.

The HOT prevents wrong interactions between different protection layers or protection segments but it introduces inefficiencies in the traffic restoration due to the long switching-time achieved by using HOT solution. Furthermore, the procedure according to HOT is time consuming. In fact, when the failure cannot be overcome by the protection mechanism operating at Server layer, a rather long time (for instance at 100 millisec) is lost.

In view of the above, the Applicant has deemed that implementing in an optical network a mechanism which is similar to the HOT was not convenient and has devised a dynamic interlayer protection method overcoming the above problems.

SUMMARY OF THE INVENTION

The above and further problems are solved by a method according to claim 1, by a network element according to claim 10 and by a network according to claim 16. Further advantageous features of the present invention are set forth in the dependent claims. All the claims are deemed to be a part of the present description.

According to a first aspect, the present invention provides a method for protecting an optical telecommunication network against possible failures and signal degrades, the network comprising at least two nodes; working resources and protecting resources connecting the nodes; a first protection mechanism operating at a first protection layer; and a second protection mechanism operating at a second protection layer, characterized by the step, carried out by a node detecting a failure that could be managed by said first mechanism, of sending downstream an in-band Forward Protection Indication signalling in order to instruct the second protection mechanism not to operate, or the step, carried out by a node detecting a Bit Error Rate between a certain range, of sending downstream an in-band Link Degradation Indication signalling in order to instruct the second protection mechanism to operate.

Possibly, said first protection layer is a section OTU-Trail layer and said second protection layer is a ODU path layer.

Preferably, said first protection mechanism comprises any of an OTU trail protection mechanism and an ODU-SPRing span switch.

Preferably, said second protection mechanism comprises any of an ODU SNC or ODU-SPRing ring switch.

Profitably, said Forward Protection Indication and Link Degradation Indication are coded signals sent into proper bits in the OverHead of ODU frame.

Preferably, said proper bits comprise bits in path monitoring field. Still more preferably, said proper bits comprise at least one status bit.

Preferably, the Bit Error Rate range activating the sending downstream of the Link Degradation Indication signalling is between about $1 \times 10^{-2}$ and $1 \times 10^{-5}$, more preferably between $1 \times 10^{-3}$ and $1 \times 10^{-4}$.

According to a second aspect, the present invention provides a network element for an optical telecommunication network comprising at least a further network element, working resources and protecting resources connecting the network elements; a first protection mechanism operating at a first protection layer; and a second protection mechanism operating at a second protection layer, characterized in that it comprises a device for sending downstream an in-band Forward Protection Indication signalling in order to instruct the second protection mechanism not to operate when a failure that could be managed by said first mechanism is detected; or a device for sending downstream an in-band Link Degradation Indication signalling in order to instruct the second protection mechanism to operate when a Bit Error Rate between a certain range is detected.

Typically, the first protection layer is an OTU-trail section layer and the second protection layer is an ODU path layer.

Typically, the first protection mechanism comprises any of an OTU trail protection mechanism and an ODU-SPRing span switch.

Typically, the second protection mechanism comprises any of an ODU SNC or ODU-SPRing ring switch.

Preferably, said a device for sending downstream an in-band Forward Protection Indication signalling and said device for sending downstream an in-band Link Degradation Indication signalling comprise a device for writing proper bits in the OverHead of ODU frame.

Profitably, said device for writing proper bits in the OverHead of ODU frame comprises a device for writing at least one bit in path monitoring field, in particular at least one status bit.

According to a third aspect, the present invention provides a telecommunication network comprising at least two network elements according to the features set forth above.

According to a forth aspect, the present invention provides an ODU frame for transmitting signals through an optical network, the network comprising at least two nodes; working resources and protecting resources connecting the nodes; a first protection mechanism operating at a first protection layer; and a second protection mechanism operating at a second protection layer, the frame comprising an ODU overhead, an OPU overhead and an OPU payload, the ODU overhead comprising a path monitoring field which in turn comprises status bits, wherein at least one bit of said status bits is written by a node detecting a failure that could be managed by said first mechanism for containing an in-band Forward Protection Indication signalling in order to instruct the second protection mechanism not to operate or at least one bit of said status bits is written by a node detecting a Bit Error Rate between a certain range for containing an in-band Link Degradation Indication signalling in order to instruct the second protection mechanism to operate.

Preferably, said Bit Error Rate range is between about $1\times10^{-2}$ and $1\times10^{-5}$, more preferably between about $1\times10^{-3}$ and $1\times10^{-4}$.

According to a fifth aspect, the present invention provides a computer program comprising computer program means adapted to perform the method according to the first aspect when said program is run on a computer.

Finally, according to a sixth aspect, the present invention provides a computer readable medium having a program recorded thereon, said computer readable medium comprising computer program code means adapted to perform the method according to the first aspect when said program is run on a computer.

The present invention will become fully clear after reading the following detailed description, with reference to the attached sheets of drawings.

BEST MODE FOR CARRYING OUT THE INVENTION

Figure 1:
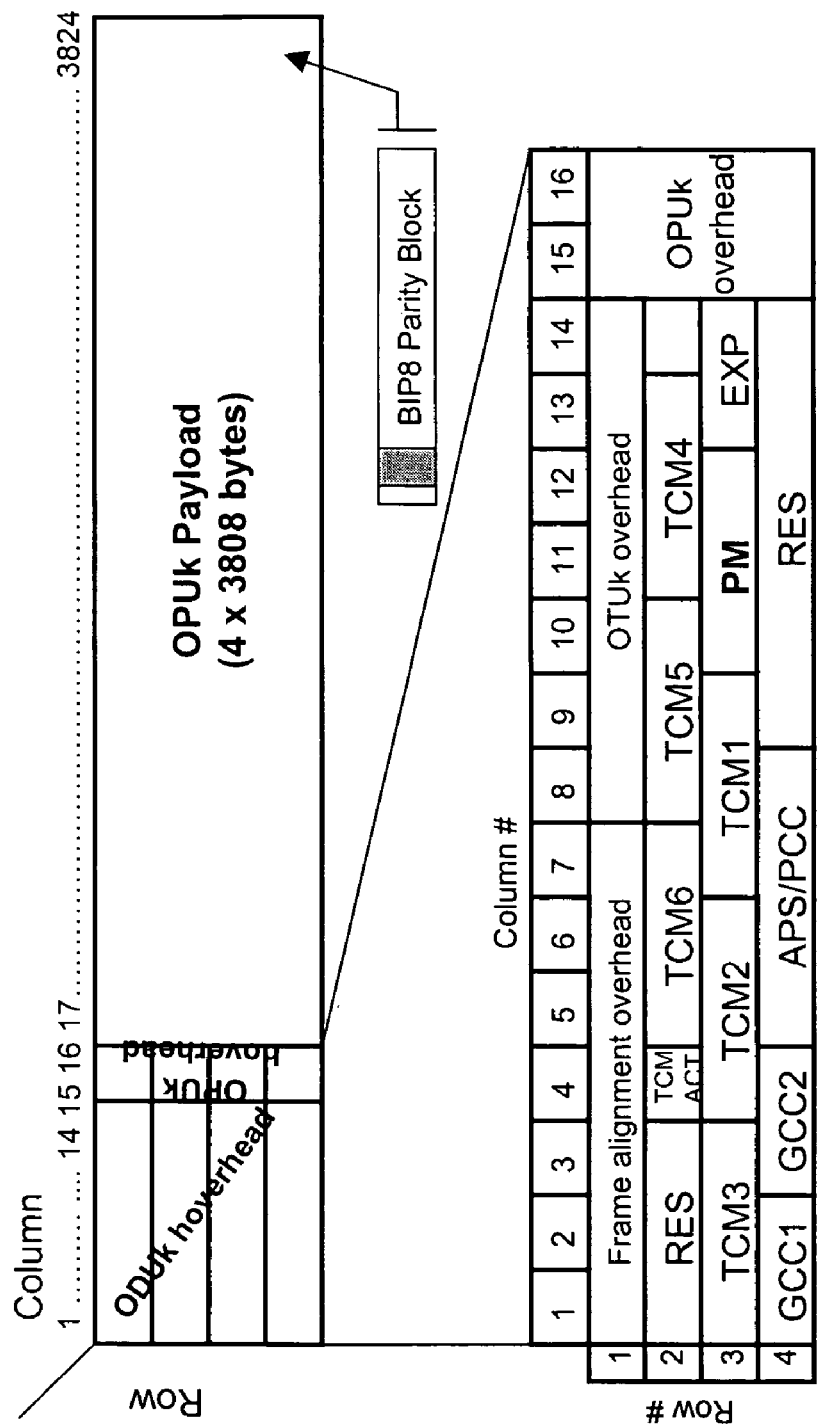
FIG. 1 corresponds to FIG. 15-3/G.709/Y1331 and represents an ODUk frame structure, with particular reference to ODUk and OPUk overhead.

As said above, the present invention pertains to the field of Optical Transport Networks (OTN). ITU-T G.709 Recommendation defines the interfaces of the optical transport network to be used within and between subnetworks of the optical network, in terms of: optical transport hierarchy (OTH); functionality of the overhead in support of multi-wavelength optical networks; frame structures; bit rates and formats for mapping client signals. In this scenario, the present invention focuses on the Optical Channel Transport Unit (OTU) layer and Optical Channel Data Unit (ODU) layer. ITU-T G.709 foresees some information to manage these layers. For each layer, the transported information is made of payload and OverHeads. Particularly, the OCH layer, made of two main units (ODU and OTU), transports payload and associated Overhead information. The purpose of the OCH is to carry information to manage and to monitor the end-to-end connection through the network. An ODU frame structure is also defined in ITU-T G.709 and shown in FIG. 1 of the present application.

As shown, the frame structure provides for, in general terms, an ODU overhead, an OPU (Optical channel Payload Unit) OverHead and an OPU payload. For the meaning of the various abbreviations, reference should be made to the relevant paragraph of ITU-T G.709.

Figure 2:
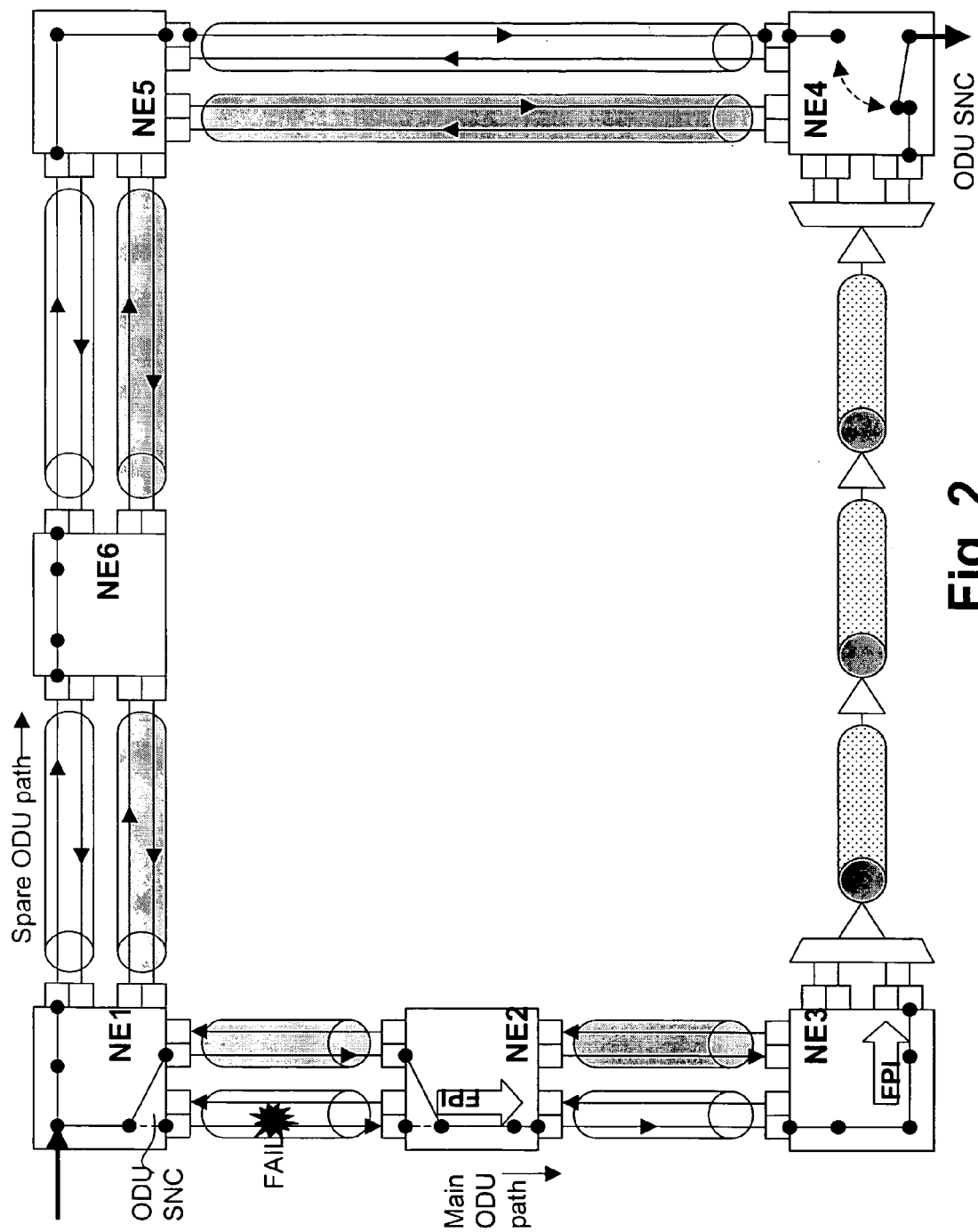
FIG. 2 shows an exemplifying network wherein an ODU Forward Protection Indication is inserted.
Figure 3:
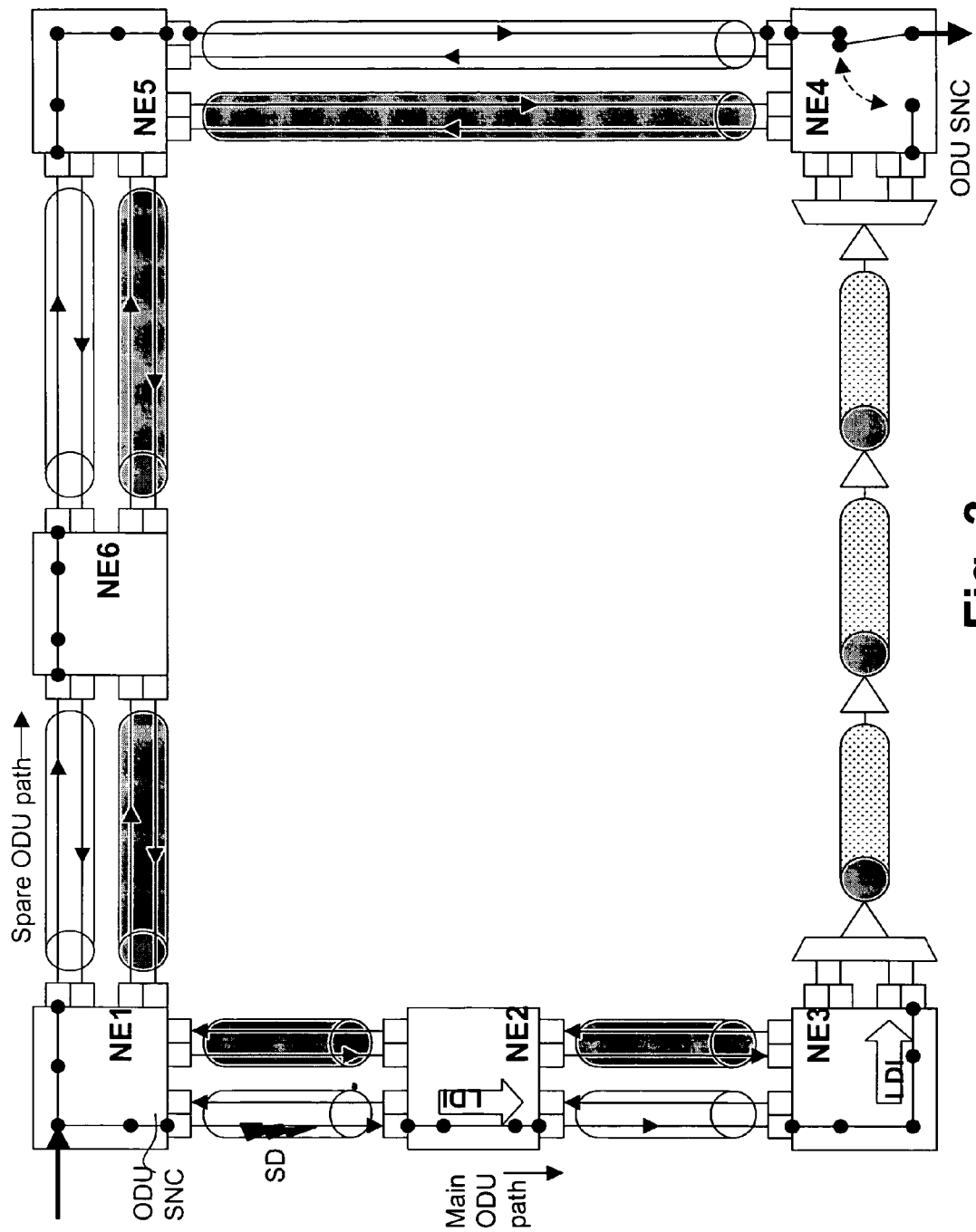
FIG. 3 shows an exemplifying network wherein an ODU Link Degradation Indication is inserted.

Both FIGS. 2 and 3 show an exemplifying optical network according to the present invention. The exemplifying network comprises a number of network nodes (or network elements) NE1, NE2, NE3, NE4, NE5, NE6, and physical links (OTU trails) connecting the network elements one with each other. Preferably, the links comprise optical fibers. Still more preferably, each link comprises working resources and protecting resources for protecting the main or working resources in case of failure or signal degradation thereof. The working resources have been indicated by white tubes whilst the protecting resources have been indicated by gray tubes for clarity reasons. When the same physical resource is used both for working and protecting resources, it has been indicated by light gray tubes. Each network element comprises input and output interfaces and switching means for carrying out a switching action in case it becomes requested by a manager.

Whilst a number of ODU paths could be established in a network, only one has been shown for clarity reasons. The shown main ODU path originates in NE1, passes through NE2 and NE3 and ends at NE4. An alternative spare path (for protection purposes) has been established. The alternative path being NE1-NE6-NE5-NE4.

With the above in mind, several standard protection mechanisms could be implemented in the network for protecting it against failures and/or signal degrades. Some of them operate at OTU layer, some at ODU layer. The first group (protection mechanisms operating at section layer) comprises:

OTU-trail: it is a linear protection mechanism that is implemented at OTU layer (the equivalent of section layer in SDH technology) and performs switching from working resources to protecting ones when a certain OTU trail becomes affected by a failure or a signal degrade;

ODU SPRing span switch: it can be considered equivalent to the MS-SPRING span switch in SDH technology as the mechanism and switches from working resources to protecting ones when a certain OTU trail becomes affected by a failure or a signal degrade in a ring network.

Similarly, the second group (protection mechanisms operating at path layer) comprises:

ODU SNC (SubNetwork Connection): it is a path protection mechanism that is implemented at ODU layer (the equivalent of path layer in SDH technology) and performs a switching from a main ODU path to a spare ODU path when a certain ODU path becomes affected by a failure or a signal degrade;

ODU SNCP (SubNetwork Connection Protocol): it is a path protection mechanism that is implemented at ODU layer (the equivalent of path layer in SDH technology) and performs a switching from a main ODU path to a spare ODU path when a certain ODU path becomes affected by a failure or a signal degrade;

ODU SPRing ring switch: it can be considered equivalent to the MS-SPRING ring switch in SDH technology as the mechanism performs a switching from a main path to a spare one when a certain ODU path becomes affected by a failure or a signal degrade.

Presently, when an OTU trail becomes affected by a failure, a proper signal (for instance an AIS) is sent by the network node detecting the failure. Both a first protection mechanism and a second protection mechanism are activated. The first being a mechanism operating at OTU trail level while the second operating at ODU level. In several cases, the first mechanism suffices for overcoming the failure and thus there should be no need to activate also the other mechanism.

When a failure affects a link, all the above network layers will be involved, especially the layers implementing a protection mechanism: they must speedily react but closer they are to the physical media, lower the reaction time will be. It is required for the protection mechanisms associated at each layer not to work simultaneously and the protection mechanism associated at the server layer has to react first.

According to the present invention, when a failure (FAIL) is detected by a network node and said failure can be managed by the protection mechanism operating at OTU trail level, a proper signaling is sent downward by the node detecting the failure. The signaling contains a "wait to switch" command in order to instruct the second protection mechanism to await a certain time before switching in view of the fact that the first mechanism can overcome the problem and there is no need to perform switches at two different levels.

According to the present invention, the network node detecting a failure generates and sends downstream an in-band ODU-FPI (Forward Protection Indication) signaling in order to instruct the second mechanism not to operate. Profitably, the bits are ODU OverHead bits, in particular, status (STAT) bits of the PM (Path Monitoring) field in the ODU frame are used. The ODU-FPI is proposed as a flag sent downstream as a "wait to switch" indication activated for all the time necessary to apply the protection mechanism in the failure affected link by using OTU-Trail/ODU-SNC/S protection. The FPI has to be managed at the ODU-Trail termination function placed and the end points of the ODU-Sub-network or at the end points of the ODU-Trail. The ODU-FPI signal disables downstream switching activation until bridge and switch operation has been completed at OTU Trail/ODU-SNC/S level.

In case of protection mechanism running in an ODU-SPRing using 4 Fiber configuration, the ODU-FPI prevents the "ring switch" action in case of span failure, when the "span switch" is acting at sub-layer or TCM level.

With reference to FIG. 2, a possible scenario which is profitably managed by the present invention will be described herebelow. The OTU trail between nodes NE1 and NE2 becomes affected by a failure (FAIL). Upon NE1 and NE2 realize that a failure has affected the NE1-NE2 OTU trail, they both perform a bridge and switch action for overcoming the failure through the protection resources of the same link. At the same time, both NE1 and NE2 write a proper code (FPI) in the STAT bits of the Path Monitoring field. The signaling is sent downwards in both the directions. The FPI code is sent during the OTU trail protection switching time or during span switch time in ODU SPRing span. The FPI code will reach NE4 so that such a node will not perform the ODU path protection. On the contrary, in the case (not shown) wherein a failure affects both the working and protection resources of a link (for instance the OTU trail between NE1 and NE2), the first protection mechanism can not overcome the failure and the FPI code will not be sent. As a consequence, the second protection mechanism will be activated by the common alarm signals generated by the nodes adjacent to the failure.

The present invention provides also a method for managing a signal degrade (SD) affecting a certain link (again, the link between NE1 and NE2 in FIG. 3).

In case of presence of a signal degrade (SD) condition, two different situations could be present:

a. The signal degrade is not managed; or b. The signal degrade is managed for protection, thus preventing possible fault condition and assuring high quality service.

FIG. 2 shows an ODU path connecting the nodes NE1 and NE4 and protected by ODU-SNC/SPRing protection mechanism performed at these nodes. A working ODU path is established between nodes NE1 and NE4 passing through nodes NE2 and NE3; in addition, a spare protecting path is established passing through nodes NE6, and NE5 up to NE4. A FEC (Forward Error Correction) is supposed to be active at any node of the ring (frame FEC regenerated at each span).

A signal degrade affects the optical link at the working resources of the link NE1-NE2. As it is known, FEC mechanisms provide very good results when the bit error rate (BER) before correction ($BER_{in}$) is less than about $1\times10^{-4}/1\times10^{-5}$, resulting in a BER after correction ($BER_{out}$)$\leq 1\times10^{-15}$. On the contrary, FEC mechanisms are almost ineffective when the BER before correction ($BER_{in}$) is higher than $1\times10^{-3}$. A critical range is established when $BER_{in}$ is between about $1\times10^{-4}$ and $1\times10^{-3}$.

When $BER_{in}$ is less than about $1\times10^{-4}/1\times10^{-5}$, no switch is performed at path level; when $BER_{in}$ is higher than $1\times10^{-3}$, a proper error counter at the end nodes of the ODU path switches on the spare path when the number of counted errors has reached a certain value.

According to the present invention, when a node adjacent to the link affected by a degrade detects a $BER_{in}$ between a certain critical range, it issues a signalling (termed ODU-LDI, Link Degradation Indication). The ODU-LDI is a coded signal that is preferably sent through the STAT bits of Path Monitoring field in the ODU frame. In absence of the present invention, a poor transmission would be provided because FEC is scarcely effective but the number of errors is not so high as to provoke a prompt switch at ODU path level.

The ODU-LDI is an indication of signal degrade detection in a generic link and is generated to activate a protection switching action either in case of ODU-Trail protection or in case of ODUk-SNC protection configuration. It is sent downstream as information indicating that upstream (in the OTU Trail section corresponding to the degraded link or in the ODU sublayer or TCM sublayer covering the degraded link) a signal degrade condition has been detected. The consequential detection of the ODU-LDI at the remote ODU-Trail termination point activates the protection switching either at ODU-Trail or at ODU-SNC level.

The present invention results in a number of advantages. Usually the Hold Off Time (HOT) technique can solve the problems related to the activation of protection mechanisms in an inter-layer environment, where a wrong interaction between layers can happen. By using this technique the client layer's switch is required to be provisioned with an HOT, that is the value necessary to define a "wait to switch" period after that a defect initiates a switch action. The HOT is a time constant that has to be set up accordingly with the switching time of the server. The client layer has to wait before switching also in the case the failure is detected in the same layer, being not possible to distinguish this case from the case in which the failure is in the server. Besides in case of unstable failure condition, when the ratio between the duration of the alarm and the non-alarm conditions is comparable (or less) with the HOT value, the protection on the client layer may not start. In case the ODU-FPI signaling is used (without HOT) the ODU-SNC protection on the client layer is stopped if the failure is in the server: this one provides its own protection mechanism. On the contrary ODU-SNC protection on the client layer starts immediately if the defect arises on the client layer and no ODU-FPI is signaled by the server. In any case, ODU-FPI and HOT are alternative solutions.

Signal Degrade management for protection actions prevents fault condition in the network assuring more traffic availability and higher quality of service. The ODU path, transporting end-to-end services, is protected by SNC scheme on the base of the ODU-LDI detection.

There has thus been shown and described a novel method and network node which fulfill all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the scope of the invention are deemed to be covered by the invention which is limited only by the claims which follow.

What is claimed is:

1. A method for protecting an optical telecommunication network against possible failures and signal degrades, the method comprising:
   connecting a plurality of nodes to a plurality of working resources;
   connecting the plurality of nodes to a plurality of protecting resources;
   operating protection switching between first working resources and first protection resources on a first protection layer using a first protection mechanism operating at the first protection layer; and
   operating protection switching between second working resources and second protection resources on a second protection layer using a second protection mechanism operating at the second protection layer,
   wherein if one of the plurality of nodes detects a failure that is correctable by said first protection mechanism, sending downstream to another one of the plurality of nodes an in-band Forward Protection Indication (FPI) signaling that disables the second protection mechanism with respect to the failure,
   wherein if one of the plurality of nodes detects a Bit Error Rate between a certain range, sending downstream to another one of the plurality of nodes an in-band Link Degradation Indication (LDI) signaling instructing the second protection mechanism to operate,
   wherein said first protection layer is a OTU-trail section layer and said second protection layer is a ODU path layer,
   wherein said first protection mechanism comprises any of an OTU trail protection mechanism and an ODU-SPRing span switch, and
   wherein said second protection mechanism comprises any of an ODU SNC switch and an ODU-SPRing ring switch.

2. The method according to claim 1, wherein said Forward Protection Indication and said Link Degradation Indication are coded signals sent into proper bits in an OverHead of an ODU frame.

3. The method according to claim 2, wherein said proper bits comprise bits in a path monitoring field.

4. The method according to claim 3, wherein said proper bits comprise at least one status bit.

5. The method according to claim 1, wherein the Bit Error Rate range activating the sending downstream of the Link Degradation Indication signaling is between $1 \times 10^{-2}$ and $1 \times 10^{-5}$.

6. The method according to claim 1, wherein the Bit Error Rate range activating the sending downstream of the Link Degradation Indication signaling is between 1×10–3 and 1×10–4.

7. A computer readable medium having a program recorded thereon, said computer readable medium comprising computer program code adapted to perform the method according to claim 1 when said program is run on a computer.

8. The method according to claim 1, wherein said Forward Protection Indication signaling comprises a wait to switch command instructing the second protection mechanism to await a predetermined time before switching so that the second protection mechanism is caused not to operate.

9. The method according to claim 1, wherein the Link Degradation Indication signaling indicates that a signal degrade signal has been detected upstream.

10. The method according to claim 1, wherein said LDI signaling indicates that an upstream signal degrade (SD) signal has been detected.

11. The method according to claim 1, wherein said FPI signaling comprises a wait to switch command instructing the second protection mechanism to await a predetermined time before switching.

12. The method according to claim 1, wherein the failure operable to be managed by said first protection mechanism is a failure occurring in said first protection layer.

13. The method according to claim 1, wherein the second protection mechanism operates only if a failure is detected in the second protection layer.

14. The method according to claim 1, wherein if one of the plurality of nodes detects a failure operable to be managed by said first protection mechanism, the FPI signaling is sent using a data plane, and
   wherein if one of the plurality of nodes detects a Bit Error Rate between a certain range, the LDI signaling is sent using the data plane.

15. The method according to claim 1, wherein the signaling between the one of the plurality of nodes and the another one of the plurality of nodes is accomplished over a single layer of the network.

16. The method according to claim 15, wherein said single layer of the network is a transport layer.

17. A network element for an optical telecommunication network comprising:
- a plurality of working resources which connect network elements;
- a plurality of protecting resources which connect the network elements;
- a first protection mechanism operating at a first protection layer that performs protection switching between first working resources and first protection resources on the first protection layer;
- a second protection mechanism operating at a second protection layer that performs protection switching between second working resources and second protection resources on the second protection layer;
- means for sending downstream an in-band Forward Protection Indication signal that disables the second protection mechanism with respect to a failure that is correctable by said first protection mechanism if the failure is detected; and
- means for sending downstream an in-band Link Degradation Indication signal instructing the second protection mechanism to operate if a Bit Error Rate between a certain range is detected,
- wherein said first protection layer is a OTU-trail section layer and said second protection layer is a ODU path layer,
- wherein said first protection mechanism comprises any of an OTU trail protection mechanism and an ODU-SPRing span switch, and
- wherein said second protection mechanism comprises any of an ODU SNC switch and an ODU-SPRing ring switch.

18. The network element according to claim 17, wherein said means for sending downstream the in-band Forward Protection Indication signal and said means for sending downstream an in-band Link Degradation Indication signal each comprise a device for writing proper bits in the OverHead of ODU frame.

19. The network element according to claim 18, wherein said device for writing proper bits in the OverHead of ODU frame comprises a further writing device which writes at least one bit in a path monitoring field, wherein the at least one bit is a status bit.

20. A telecommunication network comprising at least two network elements according to claim 17.

21. An ODU frame for transmitting signals through an optical network, the network comprising: a plurality of nodes, a plurality of working resources connecting the plurality of nodes, a plurality of protecting resources connecting the plurality of nodes, a first protection mechanism operating at a first protection layer that performs protection switching between first working resources and first protection resources on the first protection layer, and a second protection mechanism operating at a second protection layer that performs protection switching between second working resources and second protection resources on the second protection layer, the frame comprising:
- an ODU overhead;
- an OPU overhead; and
- an OPU payload,
- wherein the ODU overhead comprises a path monitoring field which comprises status bits,
- wherein at least one bit of said status bits is written by one of the plurality of nodes if the one of the plurality of nodes detects a failure which is correctable by said first protection mechanism, wherein the at least one bit is an in-band Forward Protection Indication signal sent downstream to another one of the plurality of nodes that disables the second protection mechanism with respect to the failure, and
- wherein at least one bit of said status bits is written by one of the plurality of nodes, if the one of the plurality of nodes detects a Bit Error Rate between a certain range, wherein the at least one bit is an in-band Link Degradation Indication signal sent downstream to another one of the plurality of nodes that instructs the second protection mechanism to operate,
- wherein said first protection layer is a OTU-trail section layer and said second protection layer is a ODU path layer,
- wherein said first protection mechanism comprises any of an OTU trail protection mechanism and an ODU-SPRing span switch, and
- wherein said second protection mechanism comprises any of an ODU SNC switch and an ODU-SPRing ring switch.

22. The ODU frame according to claim 21, wherein said Bit Error Rate range is preferably between about $1\times10^{-2}$ and $1\times10^{-5}$, more preferably between about $1\times10^{-3}$ and $1\times10^{-4}$.

* * * * *